United States Patent Office 2,841,521
Patented July 1, 1958

2,841,521

INSECTICIDAL COMPOSITIONS AND METHOD OF COMBATING INSECTS

Walter W. Abramitis, Downers Grove, Ill., assignor to Armour and Company, Chicago, Ill., a corporation of Illinois No Drawing. Application July 8, 1954
Serial No. 442,197

8 Claims. (Cl. 167—24)

This invention relates to insecticidal compositions and to a method of combating insects. The compositions and method of this invention are particularly concerned with the use of pyrethrins for the purpose of repelling insects and thereby protecting stored agricultural products.

Pyrethrins are the active substances in pyrethrum, which is a natural product. Synthetic analogues of pyrethrins are also known such as allethrin, furethrin, etc. Both the pyrethrins and their synthetic analogues have heretofore been used primarily as contact insecticides. While these compounds are known to have insect-repelling properties when freshly applied, it is also known that exposure to the air of these compounds leads to a rapid destruction of their insect-repelling properties. In view of this, there has been a search for means of preserving the repellency properties of pyrethrin-type insecticides, but heretofore no satisfactory means has been known to the art. The use of piperonyl butoxide in combination with pyrethrin-type insecticides has been shown to have a limited value in preserving the repellency properties of the active ingredients in pyrethrin-type insecticides, but this has not proven to be a satisfactory answer to the problem. The increase in duration of repellency is not nearly as great as would be desired for effective protection of stored agricultural products. Furthermore, piperonyl butoxide is quite expensive for this particular use.

It is therefore a general object of this invention to provide a means for prolonging the repellency of pyrethrin-type insecticides which represents a substantial improvement over piperonyl butoxide in duration of effect, toxicity, and cost. Further objects and advantages will appear as the specification proceeds.

This invention is based in part on the discovery that the stated object of the invention can be achieved by using a pyrethrin-type insecticide in admixture with a condensation product of ethylene oxide and a fatty amine or a fatty amide. For reasons which applicant has been unable to determine, condensation products of the type indicated prolong or extend the repellency of the pyrethrin-type insecticide. The surprising nature of this discovery will be brought out more fully in the following specific disclosure of the invention.

As indicated above, this invention involves the use of a pyrethrin-type insecticide in insecticidal compositions for repelling insects, rather than killing insects by contact. The term "pyrethrin-type" insecticide as used herein is intended to cover not only natural pyrethrins obtained from pyrethrum, but also synthetic analogues of such pyrethrins, such as allethrin and furethrin. Allethrin is dl-2-allyl-4-hydroxy-3-methyl-2-cyclopenten-1-one esterified with a mixture of cis and trans dl-chrysanthemum monocarboxylic acids. Furethrin in dl-2-(2-furfuryl)-4-hydroxy-3-methyl-2-cyclopenten-1-one esterified with a mixture of cis and trans dl-chrysanthemum monocarboxylic acids. The class of pyrethrin-type insecticides is characterized by high initial insect repellency and by a rapid loss of this repellency action on exposure to air. However, when this type of compound is used in accordance with the present invention, that is, in admixture with condensation products of the type indicated above, the repellency action of the pyrethrin-type insecticide can be prolonged for many months.

The other principal ingredient of insecticidal compositions prepared in accordance with the present invention can be described as a condensation product of a fatty amine or a fatty amide, that is, amines or amides prepared from higher fatty acids and condensed with ethylene oxide. Somewhat more generally, the condensation products which are useful in the present invention can be designated by the following structural formula:

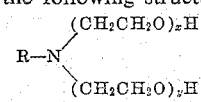

where R is an aliphatic group such as a saturated or unsaturated alkyl or acyl group containing from 6 to 22 carbon atoms. As already indicated, usually the R group will be derived from a higher fatty acid in the commercially available materials, but this is not essential to the present invention. In the type formula set out, $x$ and $y$ are integers, the sum of which is equal to the number of moles of ethylene oxide condensed with each mole of aliphatic amine or amide to produce the particular compound. Preferably, the R group contains from 12 to 18 carbon atoms. Mixtures of compounds of the type indicated can also be employed wherein the number of carbon atoms in the R group will vary and the sum of $x$ and $y$ will vary. Preferably, however, the condensation product contains from 5 to 60 moles of ethylene oxide per mole of aliphatic amine or amide. The novel action referred to above appears to be at its maximum when the condensation product contains from 15 to 30 moles of ethylene oxide per mole of aliphatic amine or amide. This action makes possible the use of mixtures of a pyrethrin-type insecticide and a condensation product represented by the type formula set out above as effective compositions in combating stored product insects by applying the mixture to the areas to be protected by the repellency action of the composition.

The compositions can be applied in any of the usual ways, such as in aqueous emulsions, solvent solutions, or as dry or wettable powders. For example, the ingredients described can be dissolved in acetone or lower alcohols like ethanol, and this solution can be applied to the areas to be protected. The compounds can also be applied in oil base carriers, or in emulsions like kerosene-water emulsions. In other words, the particular method of application is not critical for the purposes of the present invention so long as both a pyrethrin-type insecticide and a condensation product of the kind indicated are applied to the surfaces to be protected.

The compositions prepared in accordance with this invention will usually contain substantially more of the condensation product than of the pyrethrin-type insecticide, and may contain up to several hundred parts by weight of the condensation product per part of the pyrethrin-type insecticide. Preferably, from 1 to 10 parts of the pyrethrin-type insecticide are used per 100 parts of the condensation product. With these proportions the condensation product acts not only as a protective agent for prolonging the residual activity of the active ingredients, but also functions as a carrier and distributing agent.

As indicated above, this invention also involves a method of combating insects wherein insecticidal compositions of the type described are applied to surfaces subject to infestation by insects. More particularly, this invention contemplates a method of protecting agricultural products in storage comprising applying either to the agricultural products themselves or to the containers for the agricultural products compositions of the type described which are characterized by prolonged repellency action against stored product insects. The term "stored product" insects is used to designate the insects which commonly attack stored agricultural products like the red flour beetle, confused flour beetle, caddle insect, granary weevil, rice weevil, etc. For example, cloth bags or cardboard containers can be treated with the compositions of this invention, thereby effectively protecting the agricultural products contained therein from attack by insects over many months.

This invention is further illustrated by the following specific examples.

EXAMPLE 1

One-foot square sheets of brown 50-pound kraft paper were treated with the chemicals in acetone solution to give a known uniform dosage expressed in mg. per sq. ft. The sheets were then quartered, two or four pieces being used for toxicity tests and/or repellency tests. An untreated sheet was placed along one edge of the treated sheet, and a glass ring (3 inch diameter, 1 inch high) was placed on the two sheets so that one-half of the exposed surface within the ring was treated and the other one-half was untreated. Ten (or more) adult flour beetles were placed within the ringed area. After 15 minutes to allow for orientation by the insects, counts were made on the number of insects found on the treated and untreated surfaces. Readings were made periodically throughout the day, then at weekly or monthly periods. A repellency index of 60 or more indicates a statistically significant degree of repellency. Paper penetration tests have been correlated to this test. It was found that, with formulations having repellent indices of 68 or higher, there were no insect penetrations through the treated paper.

The results of tests conducted in the manner just described are summarized below in Table I.

Table I

EFFECTIVENESS OF ARMOUR CHEMICALS "ETHOMEENS" AND "ETHOMIDS" AS EXTENDERS OF PYRETHRIN ACTIVITY AGAINST THE RED FLOUR BEETLE IN INSECT REPELLENCY TESTS

| Materials | Mg./sq. ft. | 1st Wk. | 1 mo. | 2 mo. | 3 mo. | 4 mo. | 5 mo. | 6 mo. |
|---|---|---|---|---|---|---|---|---|
| Pyrethrin—Piperonly Butoxide | 10-100 | 95.3 / 82.0 | 78.5 / 74.4 | 76.0 / 69.3 | 58.4 / 69.4 | 60.7 / 64.2 | 61.7 / 66.8 | 60.4 / 56.0 |
| Pyrethrins—Cond. Prod. A | 10-200 / 10-400 | 96.3 / 90.3 | 82.1 / 64.5 | 77.9 / 70.4 | 68.5 / 70.4 | 73.6 / 63.7 | 72.2 / 67.6 | 65.2 / 73.0 |
| Pyrethrins—Cond. Prod. B | 10-200 / 10-400 | 92.3 / 93.9 | 82.0 / 85.5 | 79.3 / 75.2 | 75.6 / 76.6 | 72.3 / 74.0 | 72.2 / 69.4 | 70.1 / 68.4 |
| Pyrethrins—Cond. Prod. C | 10-200 / 10-400 | 91.5 / 90.4 | 74.6 / 63.8 | 72.4 / 72.8 | 68.7 / 69.3 | 64.4 / 65.3 | 67.3 / 68.4 | 71.7 / 72.6 |
| Pyrethrins—Cond. Prod. D | 10-200 / 10-400 | 96.2 / 94.3 | 88.2 / 86.7 | 78.8 / 86.0 | 82.6 / 78.8 | 79.9 / 79.4 | 77.6 / 78.3 | 78.6 / 78.9 |
| Pyrethrins—Cond. Prod. E | 10-200 / 10-400 | 94.6 / 94.9 | 84.6 / 85.9 | 83.5 / 86.8 | 79.8 / 77.6 | 75.9 / 79.5 | 79.0 / 76.4 | 81.0 / 80.5 |
| Piperonly Butoxide | 100 | 81.4 / 78.2 | 80.1 / 70.5 | 70.8 / 66.5 | 70.5 / 67.9 | 63.9 / 65.1 | 61.6 / 67.5 | 63.5 / 64.2 |
| Cond. Prod. A | 200 / 400 | 63.2 / 66.7 | 55.2 / 46.0 | 57.7 / 52.7 | 52.8 / 59.5 | 59.7 / 61.0 | 58.8 / 52.1 | 65.7 / 56.1 |
| Cond. Prod. B | 200 / 400 | 65.8 / 80.6 | 70.7 / 71.3 | 63.7 / 61.9 | 56.5 / 61.3 | 62.0 / 62.8 | 64.9 / 63.2 | 63.7 / 70.2 |
| Cond. Prod. C | 200 / 400 | 65.3 / 64.7 | 55.6 / 47.2 | 57.4 / 52.7 | 54.5 / 51.3 | 58.5 / 50.6 | 58.7 / 55.7 | 62.4 / 60.8 |
| Cond. Prod. D | 200 / 400 | 72.9 / 83.7 | 58.9 / 60.2 | 56.9 / 50.9 | 59.5 / 59.6 | 52.6 / 56.5 | 55.2 / 57.4 | 53.9 / 64.2 |
| Cond. Prod. E | 200 / 400 | 45.0 / 52.5 | 42.1 / 39.0 | 46.0 / 53.0 | 56.2 / 59.3 | 55.5 / 55.4 | 56.1 / 52.4 | 56.1 / 54.8 |
| Pyrethrins | 10 | 89.4 / 85.8 | 70.1 / 73.0 | 60.8 / 52.0 | 53.3 / 51.7 | 53.0 / 52.4 | 51.3 / 54.6 | 48.7 / 45.7 |
| Check, no treatment | — | 54.9 / 55.8 | 52.9 / 54.6 | 52.2 / 45.3 | 46.5 / 51.9 | 44.4 / 57.1 | 47.6 / 52.7 | 49.4 / 48.1 |

Note: 60 and higher indicates definite insect repellency. The higher the figure the greater the repellency.

The chemical identification of the condensation products referred to by capital letters in Table I are shown below in Table II. In the above table where two values appear under the heading Mg./sq. ft., the first value indicates the milligrams of pyrethrins while the second value indicates the milligrams of piperonyl butoxide or condensation products A to E, both figures being in terms of a square foot of surface area. This does not mean, however, that the pyrethrins were applied separately from the other compounds, since they were actually applied in the form of mixtures.

Table II

CHEMICAL IDENTIFICATION OF CONDENSATION PRODUCTS

| Cond. Prod. | Source of Fatty Portion | Moles Ethylene Oxide Per Mole Fatty Portion |
|---|---|---|
| A | Coco Amide | 5 |
| B | Red Oil Amide | 10 |
| C | Coco Amide | 15 |
| D | Tallow Amine | 10 |
| E | do | 15 |

While in the foregoing specification the present invention has been described in considerable detail in relation to specific embodiments thereof, it will be apparent to those skilled in the art that this invention is susceptible to other embodiments and that many of the details described herein can be varied widely without departing from the basic concepts of the invention.

I claim:

1. An insect-repelling composition, comprising a mixture of pyrethrin-type insecticide and a condensation product represented by the following type formula:

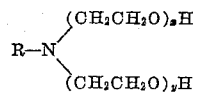

where R is an aliphatic group containing from 6 to 22 carbon atoms and $x$ and $y$ are integers having a sum of from 5 to 60, said mixture containing a larger proportion of said condensation product than of said pyrethrin-type insecticide.

2. The composition of claim 1 in which from 1 to 10 parts of said pyrethrin-type insecticide is present per 100 parts of said condensation product.

3. An insect-repelling composition, comprising a mixture of natural pyrethrins with a condensation product represented by the following type formula:

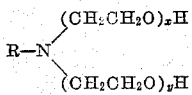

where R is an aliphatic group containing from 12 to 18 carbon atoms and $x$ and $y$ are integers having a sum of from 15 to 30, said mixture containing a larger proportion of said condensation product than of said natural pyrethrins.

4. An insect-repelling composition, comprising a mixture of a pyrethrin-type insecticide and a condensation product, said composition containing from 1 to 10 parts of said pyrethrin-type insecticide per 100 parts of said condensation product, said condensation product being represented by the following type formula:

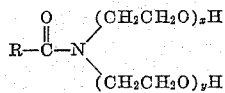

where R is a fatty acid aliphatic residue containing from 11 to 17 carbon atoms and $x$ and $y$ are integers having a sum of from 15 to 30.

5. An insect-repelling composition, comprising a mixture of a pyrethrin-type insecticide and a condensation product, said composition containing from 1 to 10 parts of said pyrethrin-type insecticide per 100 parts of said condensation product, said condensation product being represented by the following type formula:

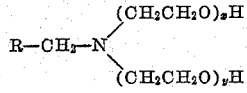

where R is a fatty acid aliphatic residue containing from 11 to 17 carbon atoms and $x$ and $y$ are integers having a sum of from 15 to 30.

6. The method of protecting agricultural products in storage, comprising applying to the agricultural product a mixture of pyrethrin-type insecticide and at least one condensation product represented by the following type formula:

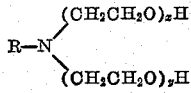

where R is an aliphatic group containing from 6 to 22 carbon atoms and $x$ and $y$ are integers having a sum of from 5 to 60, said mixture containing a larger proportion of said condensation product than of said pyrethrin-type insecticide.

7. The method of protecting agricultural products stored in insect-permeable containers, comprising applying to the container a mixture of pyrethrin-type insecticide and at least one condensation product represented by the following type formula:

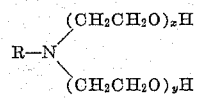

where R is an aliphatic group containing from 6 to 22 carbon atoms and $x$ and $y$ are integers having a sum of from 5 to 60, said mixture containing a larger proportion of said condensation product than of said pyrethrin-type insecticide.

8. The method of protecting agricultural products stored in insect-permeable containers against stored product insects, comprising applying to the container a mixture of natural pyrethrins with a condensation product represented by the following type formula:

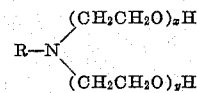

where R is an aliphatic group containing from 12 to 18 carbon atoms and $x$ and $y$ are integers having a sum of from 15 to 30, said mixture containing a larger proportion of said condensation product than of said natural pyrethrins.

References Cited in the file of this patent

UNITED STATES PATENTS

| | | |
|---|---|---|
| 1,970,578 | Schoeller et al. | Aug. 21, 1934 |
| 2,202,148 | Ginsburg | May 28, 1940 |
| 2,325,514 | Hester | July 27, 1943 |

OTHER REFERENCES

Brown: A. W. A., Insect Control by Chemicals, 1951, pp. 115–117.